(No Model.)
T. L. GRIGSBY.
GANG PLOW.
No. 287,536. Patented Oct. 30, 1883.
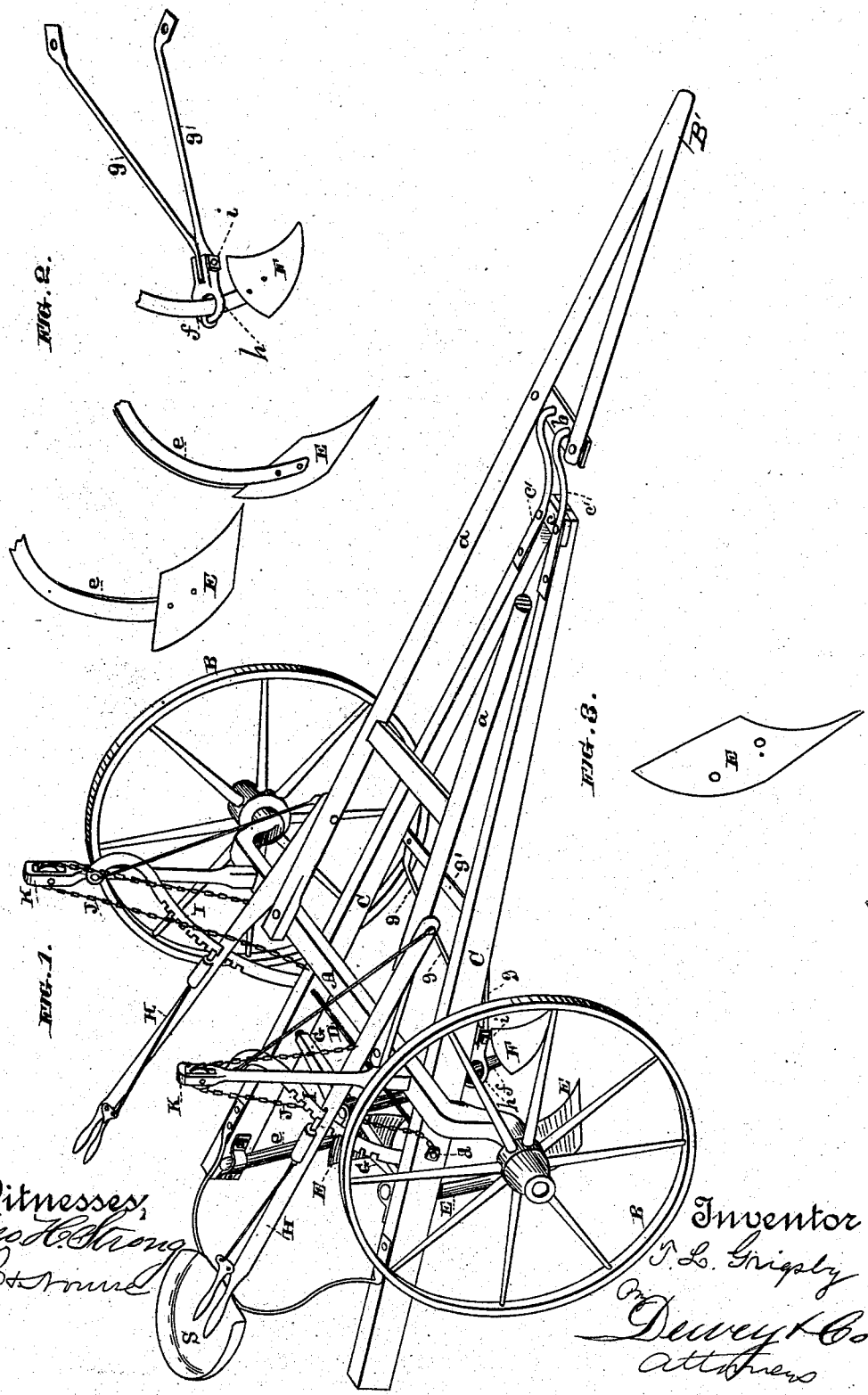

UNITED STATES PATENT OFFICE.

TYRRELL L. GRIGSBY, OF YOUNTVILLE, CALIFORNIA.

GANG-PLOW.

SPECIFICATION forming part of Letters Patent No. 287,536, dated October 30, 1883.

Application filed May 17, 1883. (No model.)

*To all whom it may concern:*

Be it known that I, TYRRELL L. GRIGSBY, of Yountville, of Napa county, State of California, have invented a Gang-Plow; and I hereby declare the following to be a full, clear, and exact description thereof.

My invention relates to certain new and useful improvements in that class of gang-plows which are specially adapted for work in vine-yards, cotton-fields, and in all places in which rows are planted.

My invention consists in the means for connecting the plows with the frame, whereby they may be adjusted, and in a center plow and the means for connecting it, all of which will be hereinafter fully explained, reference being made to the accompanying drawings.

Figure 1 is a perspective view of my gang-plow. Fig. 2 is a view of the plows and their positions. Fig. 3 shows the form of the plow.

The object of my invention is to provide a light and serviceable plow, having means for adjusting it laterally and vertically while in operation.

A is the axle, having wheels B. *a* are the reaches or tongue, to which the whiffletrees are attached.

C is a frame constructed of two beams converging to the front and extending behind the axle. The forward ends of these beams are each pivoted to a cross-piece, *c*, and have arms *c'* bolted thereto. The ends of these arms are curved and fit into sockets in a cross-piece, *b*, on the tongue B', whereby a bearing or pivot is formed for them, to enable the frame C to swing laterally and still be connected with the tongue. Between the sides of the frame C, back of the axle, is a rod or bolt, D, having a nut, *d*, on one end. By tightening up or loosening this nut the beams of frame C may be drawn closer together or separated, their pivoted forward ends allowing such motion.

E E represent the plows. These consist of a share made of a plate having somewhat of a rhomboidal shape, and suitably curved in their faces to make them turn the earth. One of these is a right-hand and the other a left-hand plow. They have no land-side, but have bolted to their back curved standards *e*, which are clipped at their upper ends to the beams of frame C. This makes a light plow, and one that will do good work for the purpose intended. One of these plows is secured to one beam of the frame C, near its rear end, and the other is secured to the other beam a little in advance. The plows are turned toward each other when the earth is to be thrown to the center, and away from each other when the earth is to be thrown from the center. This is accomplished by transferring the plows from one beam of the frame to the other.

In order to provide for breaking ground in the center, I have the shovel-plow F. The standard *f* of this is clipped to a shaft, G, mounted transversely in the beams of frame C. The journals of this shaft are long enough to permit the separation of the beams without losing their bearings. This plow F is placed centrally forward of the foremost plow, E, though it may also be mounted in the rear when the work calls for it. Plow F cuts the ground between the furrows made by plows E E, which, following the small plow, throw their earth into the cut, thus covering it up, but leaving it well broken. As the plow F is a light one, I have provided means guarding against its breaking. This is the purpose of the oscillating shaft to which it is attached. In order to brace the shaft, I have the rods *g*, extending back from a cross-piece, *g'*, on the frame C. The rear ends of these rods join and are flattened out. A strap, *h*, is bolted behind the standard *f*, and its ends, passing in front, are bent straight forward and are separated, to receive the flattened end of the rod *g*, Fig. 2. A wooden pin, *i*, passes through the ends of the strap *h* and the intervening end of brace-rods *g*, and secures them. If the plow F should meet with an obstacle, instead of being broken itself, the wooden pin *i* breaks, and the plow is enabled to yield by reason of the oscillating shaft G, to which its standard is clipped.

The means which I show for raising and lowering the frame C are similar to those used in well-known forms of cultivators. They consist of the pivoted levers H H, engaging with racks I, and the chains J, passing over pulleys in standards K. One end of the chains is secured to the levers and the other to the frame C.

The operation is obvious. The driver occupies seat S, his feet resting upon the axle A. The frame C being pivoted in front, he is enabled to swing it, by the movement of his feet, from side to side, to avoid a vine or plant or any other obstacle. With his hands he operates the levers and raises or lowers the plows. By loosening nut *d* he may separate the beams of frame C, to cause the plows to make furrows more or less separated, and thus, after finishing two furrows, can make others outside of them.

The shares of plows E may be reversed end for end, and a new cutting-edge presented when one becomes dull.

By changing the plows from one beam to the other the earth may be thrown to or from the center, as desired.

Having thus described my invention, what I desire to secure by Letters Patent is—

1. In a gang-plow, the frame C, in combination with the central plow, F, and the means for securing it to the frame, consisting of the standard *f* and oscillating shaft G, and the means for bracing it, consisting of the rods *g*, strap *h*, and wooden pin *i*, all arranged and operating substantially as and for the purpose herein described.

2. In a gang-plow, the adjustable frame C, and the right and left hand plows, E E, secured to opposite sides of said frame, in combination with the central shovel-plow, F, having standard *f*, the oscillating shaft G, brace-rods *g*, strap *h*, and wooden pin *i*, all arranged and operating substantially as and for the purpose herein described.

In witness whereof I hereunto set my hand.

TYRRELL L. GRIGSBY.

Witnesses:
J. A. McCLELLAND,
OLIVER MYERS.